(12) United States Patent
Ye et al.

(10) Patent No.: US 11,381,421 B2
(45) Date of Patent: Jul. 5, 2022

(54) USING SIGNAL RATING TO IDENTIFY SECURITY CRITICAL CAN MESSAGES AND NODES FOR EFFICIENT IMPLEMENTATION OF DISTRIBUTED NETWORK SECURITY FEATURES

(71) Applicant: Ford Global Technologies, LLC, Dearborn, MI (US)

(72) Inventors: Xin Ye, Farmington Hills, MI (US); Lisa Therese Boran, Northville, MI (US); Venkata Kishore Kajuluri, Southgate, MI (US); Kevin Smith, Dearborn, MI (US)

(73) Assignee: Ford Global Technologies, LLC, Deerborn, MI (US)

( * ) Notice: Subject to any disclaimer, the term of this patent is extended or adjusted under 35 U.S.C. 154(b) by 0 days.

(21) Appl. No.: 17/024,449

(22) Filed: Sep. 17, 2020

(65) Prior Publication Data
US 2022/0086022 A1 Mar. 17, 2022

(51) Int. Cl.
*H04L 12/40* (2006.01)
*H04L 12/64* (2006.01)

(52) U.S. Cl.
CPC .. *H04L 12/40163* (2013.01); *H04L 12/40104* (2013.01); *H04L 2012/40215* (2013.01); *H04L 2012/6464* (2013.01)

(58) Field of Classification Search
CPC ......... H04L 12/40163; H04L 12/40104; H04L 2012/40215; H04L 2012/6464
See application file for complete search history.

(56) References Cited

U.S. PATENT DOCUMENTS

| 5,854,454 | A | 12/1998 | Upender et al. |
| 7,307,994 | B2 | 12/2007 | Kurita |
| 9,294,412 | B2 | 3/2016 | Horvath et al. |
| 2003/0070022 | A1* | 4/2003 | Ito ....................... H04L 12/4135 710/240 |
| 2004/0088087 | A1* | 5/2004 | Fukushima ......... B60R 16/0232 701/29.6 |
| 2008/0112420 | A1* | 5/2008 | Wang .................. H04L 47/2433 370/401 |
| 2008/0219252 | A1 | 9/2008 | Narasimhaprasad |
| 2010/0138493 | A1* | 6/2010 | Natsume ............. H04L 12/4135 709/204 |
| 2011/0035521 | A1* | 2/2011 | Horihata ............. H04L 12/4625 710/106 |
| 2012/0105637 | A1* | 5/2012 | Yousefi ................ H04B 1/3822 348/148 |

(Continued)

OTHER PUBLICATIONS

Glabbeek, R.J.V., et al., "Split, Send, Reassemble: A Formal Specification of a CAN Bus Protocol Stack." MARS@ETAPS (2017), DOI:10.4204/EPTCS.244.2, 39 pages.

*Primary Examiner* — Stephen J Clawson
(74) *Attorney, Agent, or Firm* — Brandon Hicks; Kilpatrick Townsend & Stockton LLP

(57) ABSTRACT

Systems and methods described herein provide for assigning classifications to signals and corresponding messages for prioritization and transmission across a vehicle CAN bus. The assigned classifications are used to prioritize messages, signals, and nodes of the vehicle CAN bus. The classifications are used to prioritize critical messages and high priority messages that control operations of the vehicle system.

19 Claims, 8 Drawing Sheets

(56) References Cited

U.S. PATENT DOCUMENTS

| | | | |
|---|---|---|---|
| 2013/0163407 A1* | 6/2013 | Sinha | H04L 45/302 370/217 |
| 2014/0022912 A1* | 1/2014 | Kim | H04L 47/805 370/244 |
| 2015/0339254 A1 | 11/2015 | Hartwich | |

* cited by examiner

USING SIGNAL RATING TO IDENTIFY SECURITY CRITICAL CAN MESSAGES AND NODES FOR EFFICIENT IMPLEMENTATION OF DISTRIBUTED NETWORK SECURITY FEATURES

CROSS-REFERENCES TO RELATED APPLICATIONS

This application is related to U.S. Non-Provisional application Ser. No. 17/024,377, filed Sep. 17, 2020 which is herein incorporated by reference in its entirety for all purposes.

BACKGROUND

Vehicle computer systems handle numerous computations and processing loads during operation. Computational tasks performed by vehicle systems such as infotainment, monitoring, and diagnostic processes increase as the complexity and capabilities of such systems increases. Some communications between vehicle systems control safety, functionality, and infotainment features of the vehicle systems and may be encrypted for security against malicious attacks. A controller area network (CAN) bus architecture of the vehicle system includes nodes that publish and receive messages periodically.

SUMMARY

In some embodiments, a vehicle system includes a controller area network (CAN) bus of the vehicle system and a plurality of electronic control units communicatively coupled to the CAN bus. Each of the plurality of electronic control units transmits one or more messages of a plurality of messages over the can bus and each of the plurality of messages includes one or more signals of a plurality of signals, where each of the electronic control units is assigned a criticality rating based on a message classification of the one or more messages transmitted by the respective electronic control unit, where the message classification of each of the plurality of messages is assigned based on a signal classification of the one or more signals of the respective message. Each electronic control unit includes a memory having stored thereon instructions that, upon execution by one or more processors, causes the one or more processors to perform various operations. The operations include receiving a message of the plurality of messages from a second electronic control unit of the plurality of electronic control units. The operations also include applying a priority to the message based on the message classification and the criticality rating of the second electronic control unit. Other embodiments of this aspect include corresponding computer systems, apparatus, and computer programs recorded on one or more computer storage devices, each configured to perform the actions of the methods.

One general aspect includes a computer-implemented method. The computer implemented method includes determining a criticality rating for a first electronic control unit communicatively coupled to a controller area network (CAN) bus based on a message classification of one or more messages transmitted by the first electronic control unit, the message classification assigned based on a signal classification of one or more signals of the one or more messages. The computer-implemented method also includes receiving, at a second electronic control unit, a message from a first electronic control unit. The computer-implemented method further includes applying a priority to the message based on the message classification and the criticality rating of the first electronic control unit. Other embodiments of this aspect include corresponding computer systems, apparatus, and computer programs recorded on one or more computer storage devices, each configured to perform the actions of the methods.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
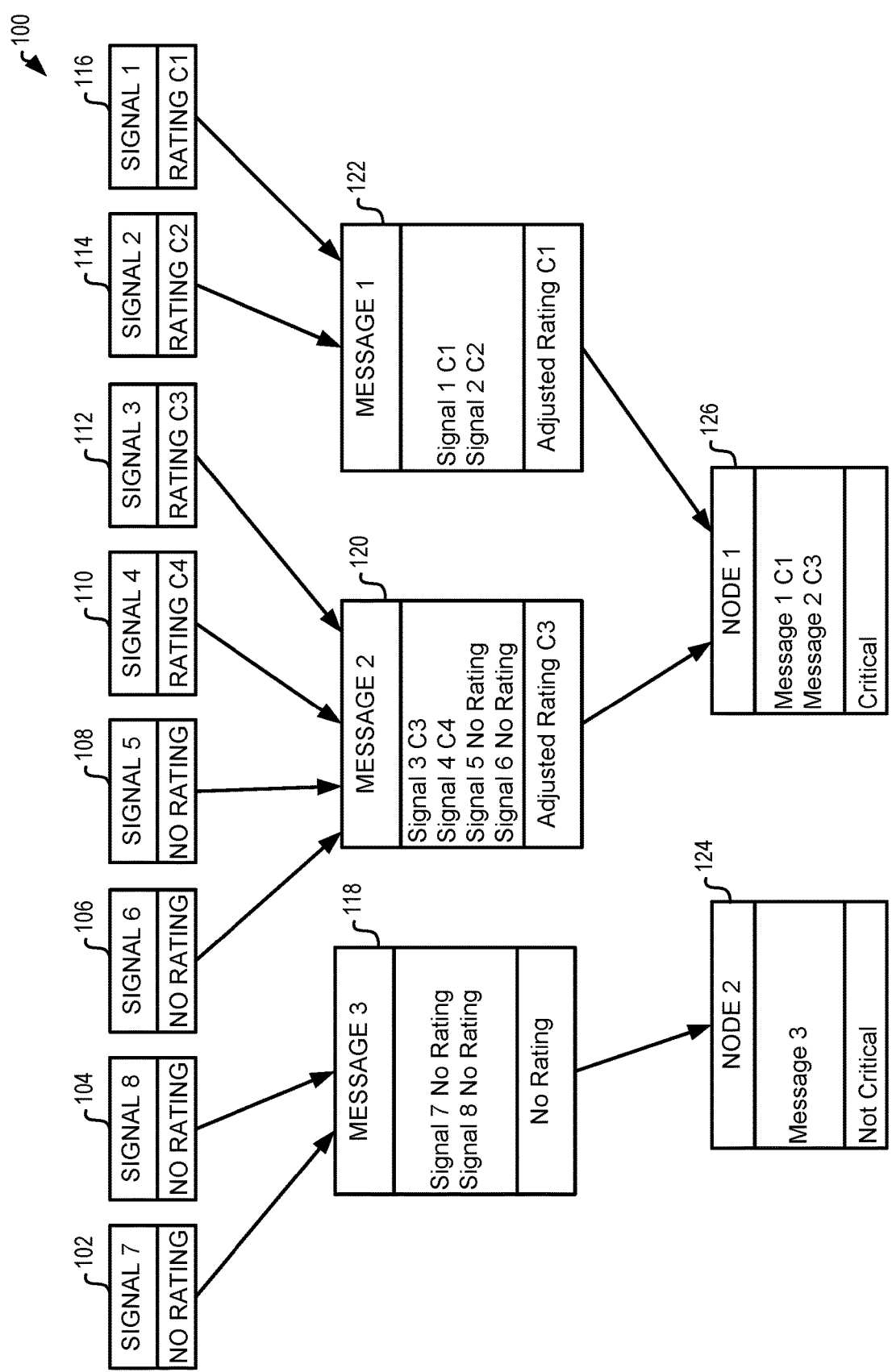
FIG. 1 illustrates a block diagram showing a nodes of a vehicle system handling messages message formed of various signals with different ratings, according to some embodiments.

Modern vehicles include many Electronic Control Units (ECUs) communicating with each other and with a vehicle computing system. Implementing message authentication on CAN network is achieved by using symmetric encryption. One important requirement for CAN message authentication is to have the secret key shared between the modules that are participating in message authentication. Features like message authentication require each individual node on the network to have additional hardware and software capabilities. Adding these additional capabilities to resource-constrained devices is both costly and labor intensive. In order to properly prioritize systems, a process to identify the most critical nodes and messages on the network is needed. The process also needs to be efficient and integral to the design and development process.

CAN networks contain a bus type architecture on which different nodes publish and subscribe messages periodically. These messages contain different signals packed into its payload structure. Signals are used to control many input output functions, carry sensor data, control actuators and many more things on a vehicle. For example, an adaptive cruise control module can sense that a vehicle is coming closer in the lane and send a signal to the brake control module to apply brakes using a CAN message. The signals can be treated as the basic elements of communication on CAN network.

Implementing distributed security features like message authentication requires the communicating modules to have specific hardware and software capabilities. For example, a Hardware Security Module (HSM) or Secure Hardware Extension (SHE) for secret key storage and cryptographic computation and special software to process cryptographic information. In addition, each secured message can add up to 1% to the CPU overhead on the node.

While applying authentication features to the CAN network it is very inefficient to include all the nodes on the network and all the messages into the scope. Only a subset of the nodes may be performing very basic and non-critical functions on the vehicle whereas few nodes might be performing security critical functions. Also, among the nodes that carryout critical operations, not every single message that is transmitted and received can be considered as critical.

In an illustrative example, consider a first message that controls a powered seat of the vehicle system and a second message that controls a brake module to apply the brakes for the vehicle system. Each of these messages are transmitted on the CAN bus, however the brake control message is critical to the operation of the vehicle while the seat control is not critical and not prioritized. To properly prioritize the messages on the CAN bus, a signal and message rating system and method can provide rankings and categories for signals and messages to ensure critical messages are properly authenticated and secured.

From a vehicle perspective, the most critical operations are related to the vehicle motion/control of the vehicle, safety of humans in and around a vehicle, security of the vehicle, and conformance to different regulations. The majority of the features/functions in a vehicle belong to one of the four operations. Hence, for signal and message rating, categories of ratings may include a vehicle motion rating, a safety rating, a security rating, and a regulatory rating.

The systems and methods described herein provide several advantages over conventional systems and methods. For example, signal rating provides process efficiency and security by system design. The signal rating is useful for identifying critical messages and network nodes. This identification is useful for efficient implementation of network security features, such as message authentication. The signal rating is further tied to signal types, which are part of a system design, improving security analysis and enabling identification of critical signals for security by design practices. Further, the signal rating can enable identification of potential security issues in early stages of system design to ensure design for security.

Turning now to FIG. 1, a block diagram 100 showing a nodes of a vehicle system handling messages message formed of various signals with different ratings is displayed, according to some embodiments. The ratings of each signal 102-116 and the adjusted rating of each message 118-122 is also indicated in FIG. 1 in addition to ratings of nodes 124-126, illustrating how categories of messages may be assigned to preserve a ranking of priority with respect to critical messages, and to prioritize critical over non-critical messages.

The signals 102-116 each have different ratings based on the contents of each signal. As described previously, the ratings may be assigned based on the functions controlled or affected by the signals, for example including vehicle motion signals, security signals, safety signals, and regulatory signals. Each signal may be classified to one of a plurality of the categories, including an unrated category for non-critical messages. The ratings of the various signals may also be based on the potential impact to the vehicle system of each of the signals.

The signals 102-116 are rated critical or not critical (no rating), with each of the critical signals receiving ranked ratings C1-C4 based on a categorization of the type of signals and priority of each signal to the vehicle system. The ratings for critical signals may be based around an architecture describing operations are related to the vehicle motion/control of the vehicle, safety of humans in and around a vehicle, security of the vehicle, and conformance to different regulations. The vehicle motion signals relate to signals used for controlling vehicle motion functions on the vehicle system. The safety critical signals are used for controlling safety features and functions on the vehicle system. The security signals are used for security features on the vehicle system. The regulatory signals are used for regulatory features on the vehicle system. Additionally, non-critical signals do not perform any critical operation on the vehicle system. In some examples, the vehicle motion may be the most prioritized, followed by safety signals, security signals, and regulatory signals. The non-critical signals are rated below all of the critical signals.

Each message 118-122 can carry multiple signals that belong to different categories or signals that do not fall into any of the listed categories. Accordingly, the signal rating of signals contained within the message can be used to assign an overall rating to messages 118-122. In one example, the category of the messages 118-122 can be assigned based on the highest category of signal rating as the message category. For example, message 3 118 may include signal 7 102 and signal 8 104 which are each not rated, such that message 3 118 also has no rating. Message 2 120 may include signal 6 106, signal 5 108, signal 4 110, and signal 3 112. This results in message 2 120 including categories of ratings C3 and C4 as well as unrated messages. Message 2 120 has an overall adjusted rating of C3. Message 1 122 includes signal 1 116 and signal 2 114 with ratings C1 and C2. Message 1 122 therefore receives an adjusted rating of C1, the highest rating of the signals contained within message 1 122.

When a message or signal is used to perform more than one type of operation, the message or signal is assigned only the highest category rating. The ECU or node of the vehicle system may analyze each of the signals and categorize them based on potential impacts to vehicle systems. For example, a brake control signal in a brake control message can be categorized as a C1 rating—related to vehicle motion. A seat control signal can be categorized as non-critical to prioritize the brake control signal over the seat control signal. In some examples, categories can be obtained from defined settings from expert predeterminations. Once a signal rating is obtained, it is possible to identify which messages carry critical signals. After identifying the messages, the ECUs that communicate critical messages can be identified on the CAN bus of the vehicle system.

Once messages 118-122 are assigned ratings, as described above, nodes 124-126 which handle messages 118-122 can be categorized as critical and non-critical. For example, particular symmetric keys are associated with each category of rating. In particular, every C1 category message will share a symmetric key, C2 category messages will share a symmetric key, though different from the symmetric key of C1. Messages carrying different signals for different critical functions are encrypted and decrypted using different keys, such that the functions are localized and isolated from one another.

Figure 2:
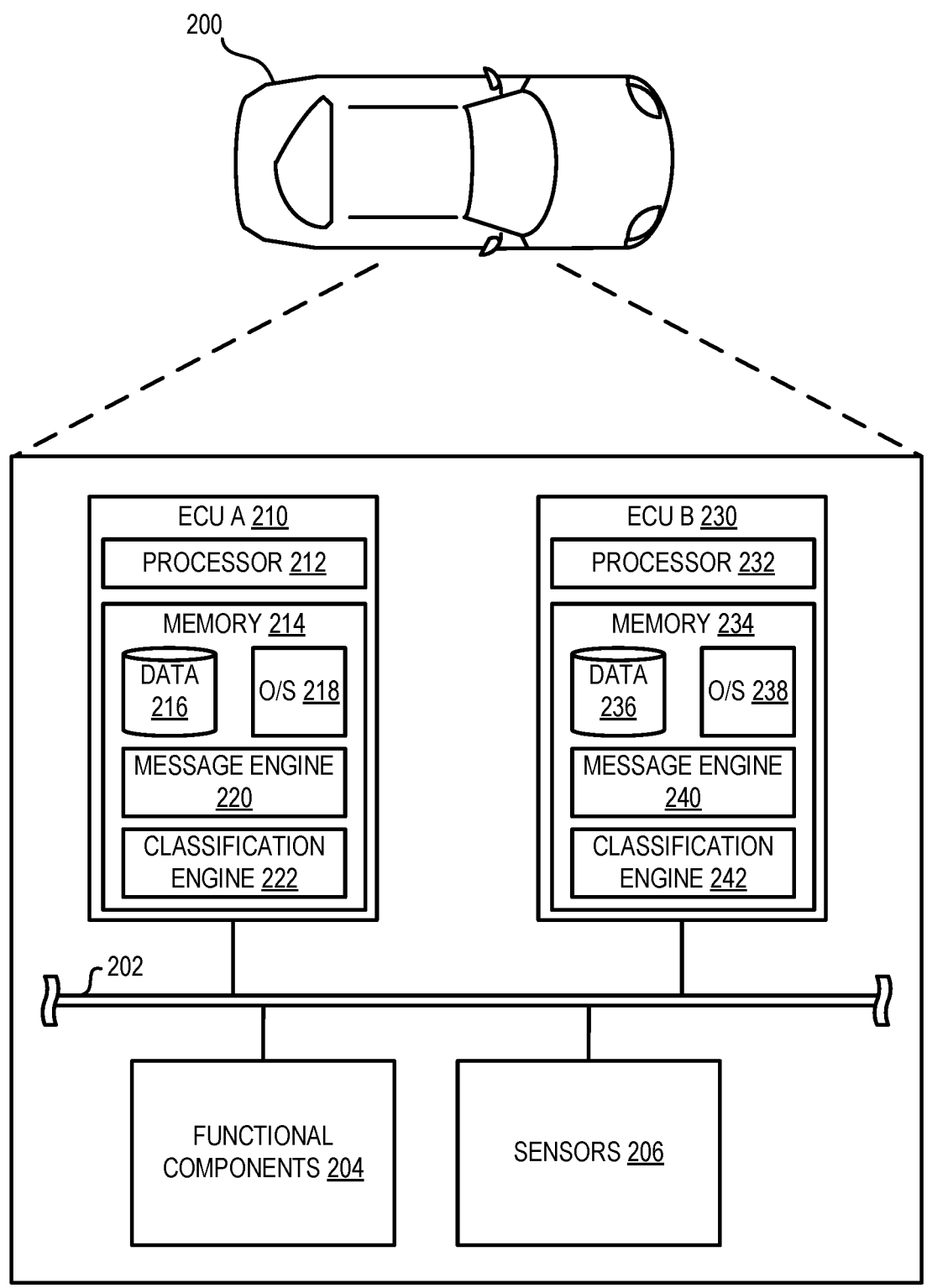
FIG. 2 illustrates a system architecture for a vehicle system involved in assigning categories and symmetric keys for encrypting messages, according to some embodiments.

FIG. 2 illustrates a system architecture for a vehicle system 200 involved in assigning categories to signals and messages, according to some embodiments. The vehicle system 200 enables secure transmissions and identification of critical signals, messages, and nodes of the vehicle system 200. The vehicle system 200 includes computing systems, at least including ECU A 210 and ECU B 230. The vehicle system 200 may be any suitable vehicle system, such as described with respect to FIG. 7. ECU A 210 and ECU B 230 communicate over CAN bus 202. The CAN bus 202 may also provide communication between functional components 204 and sensors 206 and ECU A 210 and ECU B 230. Functional components 204 may provide functions of the vehicle system 200 such as motion, security, safety, regulatory, and other functions of the vehicle system 200. The sensors 206 may provide data to the ECUs 210 and 230 and to other components of the vehicle system 200 for ensuring proper operation of the vehicle system 200.

In one illustrative configuration, ECU A 210 may include at least one memory 214 and one or more processing units (or processor(s) 212). The processors(s) 212 may be implemented as appropriate in hardware, computer-executable instructions, firmware, or combinations thereof. Computer-executable instructions or firmware implementations of the processor(s) 212 may include computer-executable or machine executable instructions written in any suitable programming language to perform the various functions described. ECU B 230 may also include a memory 234 and processor(s) 232 similar to the memory 214 and processor 212 of ECU A 210.

The memory 214 and 234 may each store program instructions that are loadable and executable on the processor(s) 212 and 232, as well as data generated during the execution of these programs. Depending on the configuration and whether implemented within an ECU or a stand-alone computing system, the memory 214 and 234 may be volatile (such as random access memory (RAM)) and/or non-volatile (such as read-only memory (ROM), flash memory, etc.). In some implementations, the memory 214 and 234 may include multiple different types of memory, such as static random access memory (SRAM), dynamic random access memory (DRAM) or ROM.

Turning to the contents of the memory 214 and 234, each may include identical or similar components, as described below. For example, database 216 and 236, operating system 218 and 238, message engine 220 and 240, and classification engine 222 and 242 may each include similar components and elements. Though only one of each of the components may be described below, each of the similar elements may include similar components. In more detail, the memory 214 may include an operating system 218 and one or more application programs or engines for implementing the features disclosed herein including at the message engine 220 and the classification engine 222. The memory 214 may also include system data (not shown), which provides information to be processed by and/or consumed by the engines 220-222.

For the purposes of this disclosure, any of the engines 220-222 may be any set of computer executable instructions installed upon, and executed from, a computing system of the vehicle system 200, such as a computing system of ECU A 210 or ECU B 230. Engines 220-222 may be installed on any of the computing systems described herein by a manufacturer or by another entity. In some embodiments, the engines 220-222 may cause the elements of the vehicle system 200 to establish a communication session with another one of the elements of the vehicle system 200.

In accordance with at least some embodiments, the message engine 220 may be configured to generate messages including one or more signals for communicating information across the CAN bus 202. For example, the message engine 220 may receive data from one or more sensors 206 or functional components 204 and generate messages and signals.

The classification engine 222 may be configured to determine a rating or classification of one or more signals as well as a rating of one or more messages conveyed from the ECU across the CAN bus 202. In some examples, the classification engine 222 may interface with an encryption engine (not shown) to encrypt and decrypt messages and data exchanged between elements of vehicle system 200 over CAN bus 202. The encryption engine is configured to generate or access a stored symmetric key for encrypting data contained in a message.

In accordance with at least some embodiments, the encryption engine, classification engine 222, and message engine 220 may include separate sub-engines for generation, classification, and encryption and decryption, which may share a common communication interface and/or common libraries. The database 216 may comprise any suitable persistent data storage system. In some embodiments, the database 216 may be stored in a database. Information stored in the database 216 may be accessed by the encryption engine via a database query or any other suitable data retrieval means.

In some embodiments, the database 216 may comprise information to be associated with various functions and actions of the vehicle system 200. The database 216 may include a source table and one or more searchable tables, each associated with particular data or information. In some embodiments, the database 216 may comprise at least some ciphertext data and at least some plaintext data.

Figure 3:
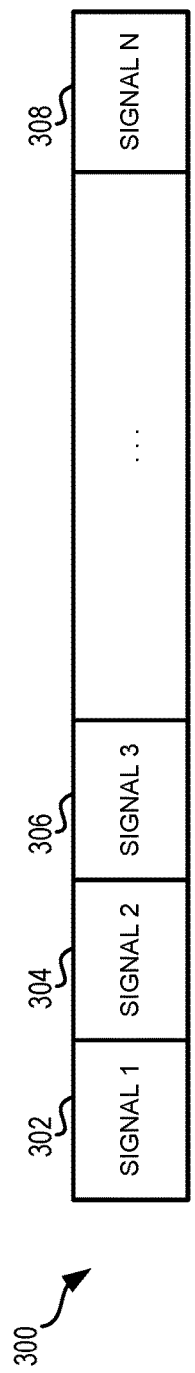
FIG. 3 illustrates a block diagram showing elements of a message conveyed across a vehicle CAN bus, according to some embodiments.

FIG. 3 illustrates a block diagram showing elements of a message 300 conveyed across a vehicle CAN bus, according to some embodiments. The message 300 is composed of signals 302-308. The signals 302-308 each control one or more operations of systems of the vehicle system, such as vehicle system 700 of FIG. 7. The signals 302-308 are each compiled together into the single message 300. The message 300 may be a payload of an authenticated message 400 as shown in FIG. 4.

The message 300 can be conveyed across the CAN bus periodically, or as data is received. The message 300 contain different signals packed into its payload structure. Signals 302-308 are used to control many input output functions, carry sensor data, control actuators and many more things on a vehicle. For example, an adaptive cruise control module can sense that a vehicle is coming closer in the lane and send a signal to the brake control module to apply brakes using a CAN message. The signals 302-308 can be treated as the basic elements of communication on CAN network.

Figure 4:
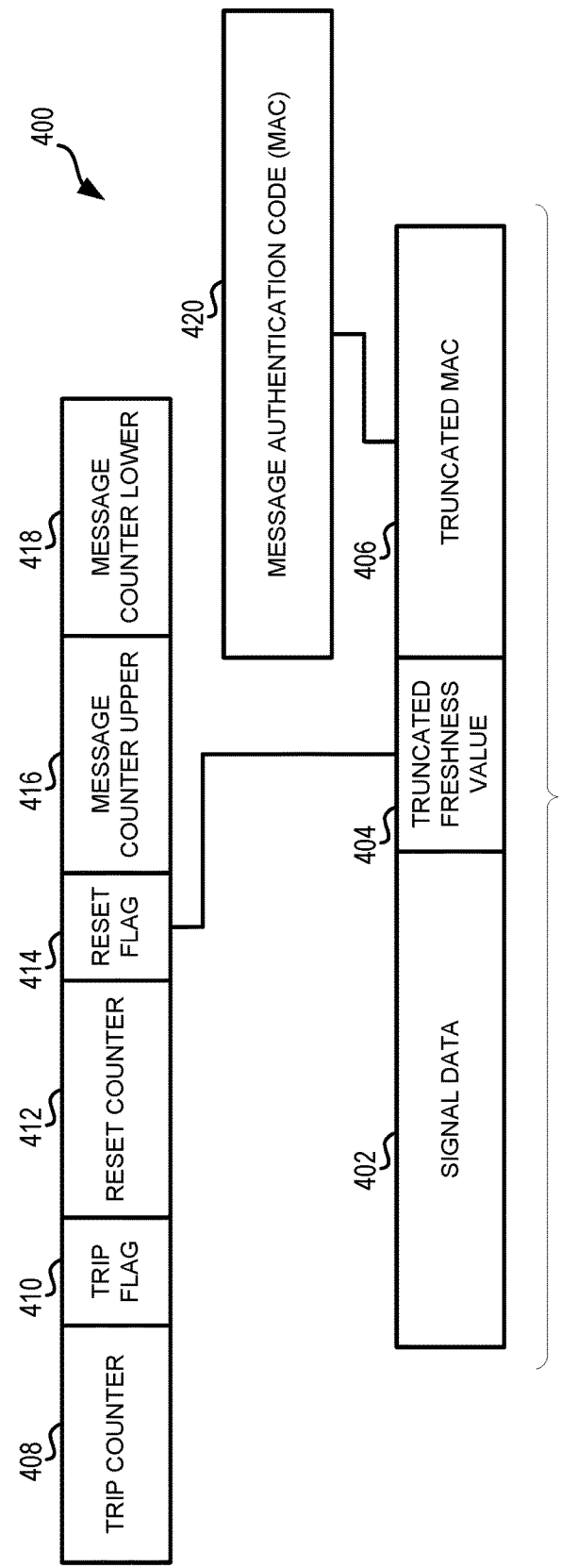
FIG. 4 illustrates a block diagram showing an authenticated message formed of various components, according to some embodiments.

FIG. 4 illustrates a block diagram showing an authenticated message 400 formed of various components, according to some embodiments. The authenticated message 400 includes the signal data 402 contained in message 300 as well as a truncated freshness value 404 and a truncated message authentication code 406. The truncated freshness value and message authentication code (MAC) may be referred to as "security data." The security data is placed into the authenticated message, for example into an arbitration space (e.g., 18-bits) and a second portion of the security data into the remaining bits of the payload field in the data space. A receiving device may predict a freshness value based on the truncated freshness value received and a value stored locally.

The freshness value may include trip counter information 408, trip flag data 410, reset data 412, reset flag 414, message counter upper 416, and message counter lower 418. The freshness value is a value stored in memory that changes from time to time. In some examples, the freshness value is a counter that increments when the ECU transmitter transmits an authenticated message. Alternatively, in some examples, the freshness value maybe based on a global timer (e.g. a value broadcast from time-to-time by one of the ECUs 210 and 230), a course timer value (e.g., an 16-bit counter that rolls over every 24-hours the vehicle is powered on, etc.), a trip counter, etc. In some examples, the freshness value is reset and/or resynchronized when the vehicle power cycles. In some examples, the freshness value has a length of 48-bits (6 bytes).

Upon receiving an authenticated message 400, a receiving node retrieves the security data with the truncated freshness value 404 and the truncated MAC 406, and the payload. Based on a stored freshness value (e.g., an older/out-of-date freshness value) stored in memory and the truncated freshness value 404, the receiver node may predict or determine the full freshness value used by the transmission module. The receiver node generates a verification MAC based on the predicted full freshness value, the payload, and the encryption key. The receiver node compares the truncated MAC 406 to the verification MAC. If a portion of the verification MAC matches the truncated MAC 406, the receiver module determines that the source of the message is authorized to communicate via the vehicle data bus. Otherwise, if a portion of the verification MAC does not match the truncated MAC 406, the receiver node determines that the source of the message is not authorized to communicate via the vehicle data bus and ignores the message.

Figure 5:
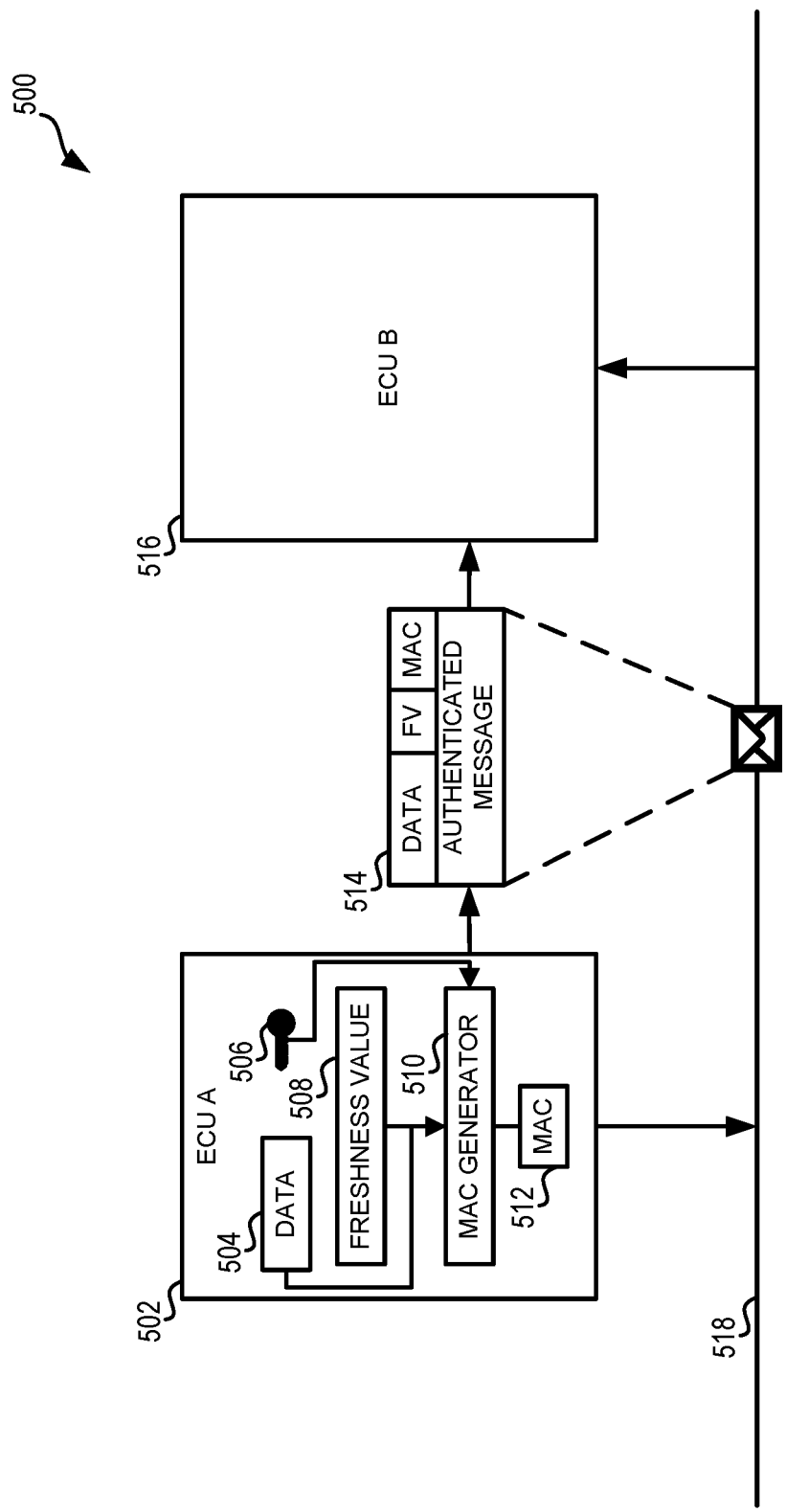
FIG. 5 illustrates a block diagram illustrating a system for generating and classifying messages for communication across a CAN bus, according to some embodiments.

FIG. 5 illustrates a block diagram illustrating a system 500 for generating and classifying messages for communication across a CAN bus 518, according to some embodiments. The system 500 includes ECU A 502 and ECU B 516 communicating over CAN bus 518. Messages 514 are conveyed across CAN bus 518. The messages 514 may be the authenticated messages of FIG. 4.

ECU A 502 includes sub components for generating and transmitting messages. The ECU includes data 504 which can be appended with a freshness value 508 and a MAC 512 generated by a MAC generator 510 to generate the message data. The message data is authenticated using encryption key 506 to generate the authenticated message 514. The authenticated message 514 includes signals, as shown in FIG. 3 and with signal ratings and message ratings as shown in FIG. 1. As such, the message 514 can be authenticated and classified based on a critical rating assigned by ECU A 502.

Figure 6:
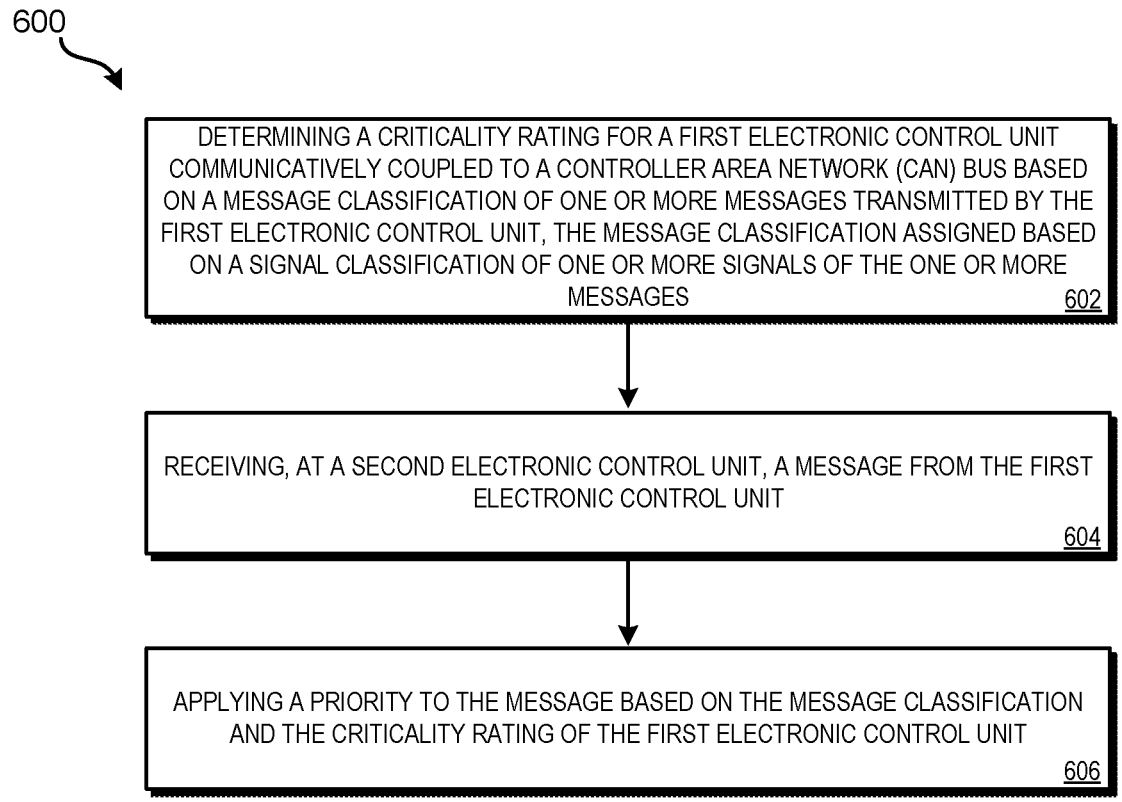
FIG. 6 illustrates a method for assigning classifications to messages across a CAN bus, according to some embodiments.

FIG. 6 illustrates a method classifying for assigning classifications to messages across a CAN bus, according to some embodiments. The method 600 may be performed by, for example, a computing system such as a computing system of the vehicle system 200, ECU A 210, ECU B 230, or may be performed by the computing system 702 of the vehicle system 700 of FIG. 7 or potentially by a cloud computing system 900 of FIG. 9. Though the steps of method 600 are presented in sequential order, some or all of the steps may be performed in different sequences, including simultaneously, in some examples.

At step 602, the computing device determines a criticality rating for a first electronic control unit communicatively coupled to a controller area network (CAN) bus based on a message classification of one or more messages transmitted by the first electronic control unit, the message classification assigned based on a signal classification of one or more signals of the one or more messages. The criticality rating may include one of a critical rating or non-critical rating. The critical rating may be one of the ratings as described herein, such as a rating based on systems impacted by the signal or message. The rating may be ranked based on a priority ranking as described herein above, with vehicle motion prioritized first above vehicle safety, vehicle security, and regulatory signals.

At step 604, the computing device receives, at a second electronic control unit, a message from the first electronic control unit. The message may be an authenticated and encrypted message, such as the authenticated message 514. The message may include one or more signals, each signal having a critical or non-critical rating. The message itself may have an overall rating based on the signals contained therein. Furthermore, the sending or receiving node on the CAN bus may have a critical or non-critical rating based on messages handled by the node, such that messages handled by a critical node may be automatically classified as critical information.

At step 606, the computing device applying a priority to the message based on the message classification and the criticality rating of the first electronic control unit. The priority for the message may be based on the classification rating, The priority rating may be useful for applying encryption, security, and other such protocols to ensure security of the vehicle system while also ensuring efficiency of the communications across the CAN bus of the vehicle system.

Figure 7:
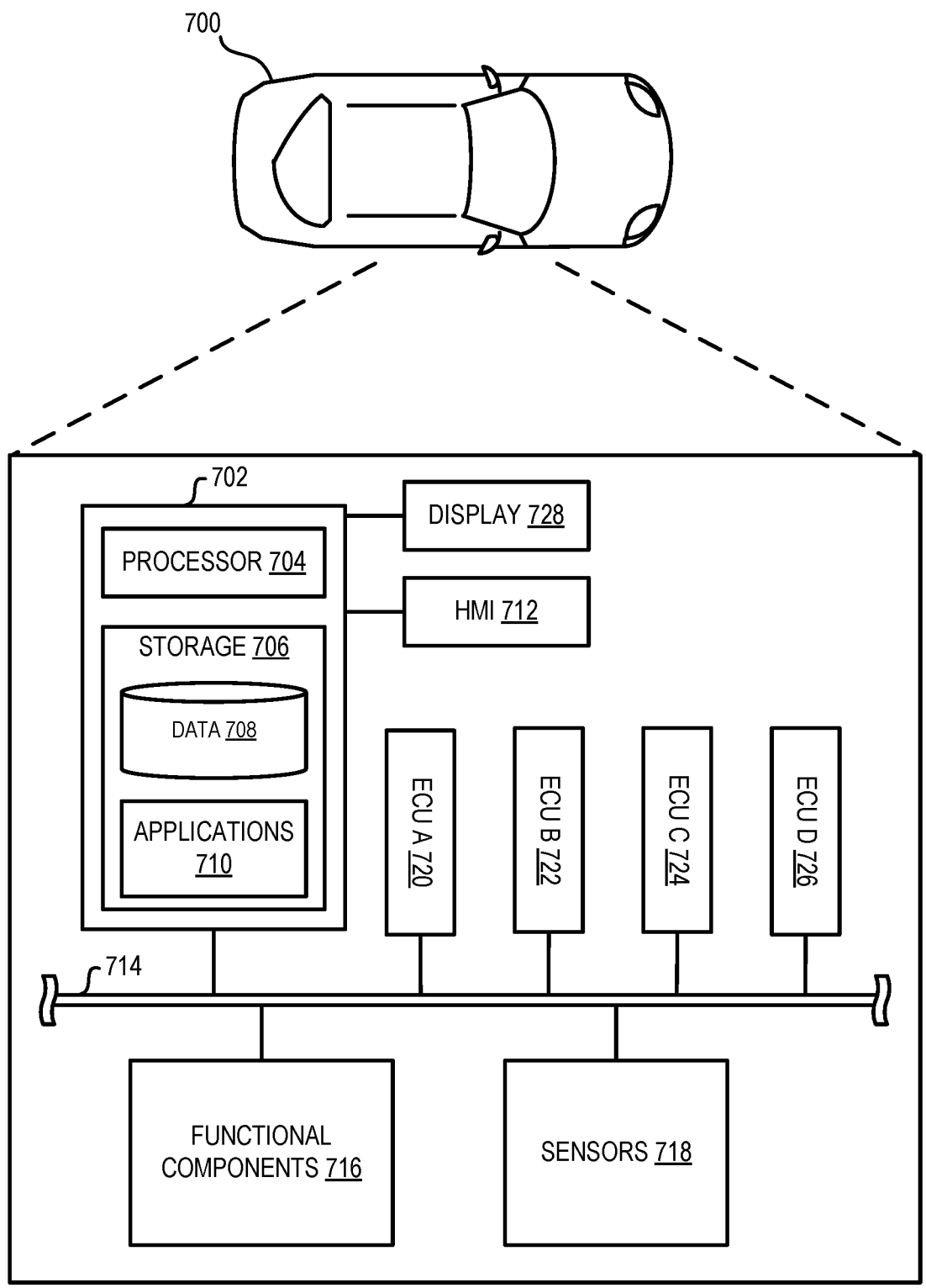
FIG. 7 illustrates a block diagram of a vehicle system, according to some embodiments.
Figure 8:
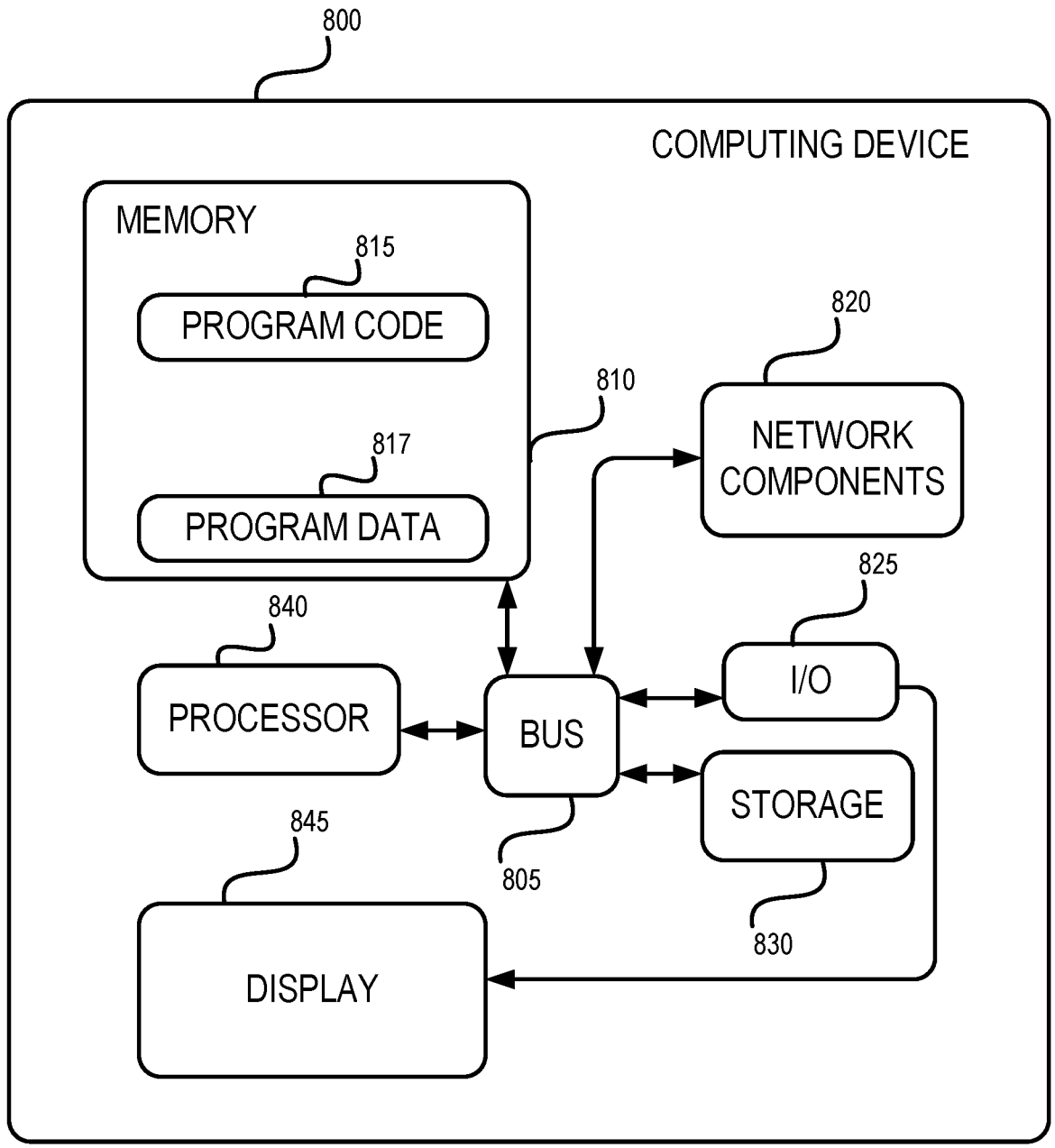
FIG. 8 illustrates a block diagram of a computing system, according to some embodiments.

Any suitable computing system or group of computing systems can be used for performing the operations or methods described herein. For example, FIG. 7 illustrates a vehicle system including a computing system 702 as well as multiple ECUs which may perform some or all of the functions described herein. FIG. 8 further depicts an example of a computing device 800 that may be at least a portion of computing system 702.

FIG. 7 illustrates a block diagram of a vehicle system 700, according to some embodiments. The vehicle system 700 may include a computing system 702 configured to communicate over an in-vehicle network 714. The computing system 702 includes a processor 704 and storage 706. While a vehicle system 700 is shown in FIG. 7, the example components as illustrated are not intended to be limiting. Indeed, the vehicle system 700 may have more or fewer components, and additional or alternative components and/or implementations may be used. It should be noted that the use of a vehicle system 700 environment is illustrative, as the components and/or functionality may be utilized in other types of systems such as flight control system in an airplane, or a medical device or industrial machine.

The vehicle system 700 may include various types of automobile, crossover utility vehicle (CUV), sport utility vehicle (SUV), truck, recreational vehicle (RV), boat, plane or other mobile machine for transporting people or goods. In many cases, the vehicle system 700 may be powered by an internal combustion engine. As another possibility, the vehicle system 700 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 700 may vary, the capabilities of the vehicle system may correspondingly vary. As some other possibilities, vehicle system 700 may have different capabilities with respect to passenger capacity, towing ability and capacity, and storage volume.

The computing system 702 may include a Human Machine Interface (HMI) 712 and a display 728 for user interaction with the computing system 702. An example computing system 702 may be the SYNC™ system provided by FORD MOTOR COMPANY™ of Dearborn, Mich. In some examples the display 728 may include a vehicle infotainment system including one or more displays. The HMI 712 may be configured to support voice command and BLUETOOTH™ interfaces with the driver and driver carry-on devices, receive user input via various buttons or other controls, and provide vehicle status information to a driver or other vehicle system 700 occupants. For instance, the computing system 702 may interface with one or more buttons or other HMI 712 configured to invoke functions on the computing system 702 (e.g., steering wheel audio buttons, a push-to-talk button, instrument panel controls, etc.). The computing system 702 may also drive or otherwise communicate with the display 728 configured to provide visual output to vehicle occupants, e.g., by way of a video controller. In some cases, the display 728 may be a touch screen further configured to receive user touch input via the video controller, while in other cases the display 728 may be a display only, without touch input capabilities. In an example, the display 728 may be a head unit display included in a center console area of the vehicle system 700. In another example, the display 728 may be a screen of a gauge cluster of the vehicle system 700.

The computing system 702 may further include various types of computing apparatus in support of performance of the functions of the computing system 702 described herein. In an example, the computing system 702 may include one or more processors 704 configured to execute computer instructions, and a storage 706 medium on which computer-executable instructions and/or data may be maintained. A computer-readable medium (also referred to as a processor-readable medium or storage 706) includes any non-transitory (e.g., tangible) medium that participates in providing data (e.g., instructions) that may be read by a computer (e.g., by the one or more processors 704). In general, the processor 704 receives instructions and/or data, e.g., from the storage 706, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc. The storage 706 may include divisions for data 708 and applications 710. The data 708 may store information such as databases and other such information. The applications 710 may store the computer-executable instructions or other such instructions executable by the processor 704.

The computing system 702 may be configured to communicate with mobile devices of the vehicle system 700 occupants. The mobile devices may be any of various types of portable computing device, such as cellular phones, tablet computers, smart watches, laptop computers, portable music players, or other devices capable of communication with the computing system 702. As with the computing system 702, the mobile device may include one or more processors configured to execute computer instructions, and a storage medium on which the computer-executable instructions and/or data may be maintained. In some examples, the computing system 702 may include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternately, the computing system 702 may communicate with the mobile device over a wired connection, such as via a USB connection between the mobile device and a Universal Serial Bus (USB) subsystem of the computing system 702.

The computing system 702 may be further configured to communicate with other components of the vehicle system 700 via one or more in-vehicle networks 714. The in-vehicle networks 714 may include one or more of a vehicle controller area network (CAN), an Ethernet network, or a media oriented system transfer (MOST), as some examples. The in-vehicle networks 714 may allow the computing system 702 to communicate with other units of the vehicle system 700, such as ECU A 720, ECU B 722, ECU C 724, and ECU D 726. The ECUs 720, 722, 724, and 726 may include various electrical or electromechanical systems of the vehicle system 700 or control various subsystems of the vehicle system 700. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle system 700); a radio transceiver module configured to communicate with key fobs or other vehicle system 700 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which may not be present in some configurations), a global positioning system (GPS) module configured to provide vehicle system 700 location and heading information, and various other vehicle ECUs configured to corporate with the computing system 702. The subsystems controlled by the various ECUs may include functional components 716 of the vehicle system 700 including elements such as the powertrain, engine, brakes, lights, steering components, and the like. Additionally, some or all of the functional components 716 may include sensors 718 as well as additional sensors equipped to the vehicle system 700 for detecting various states, positions, proximity, temperature, and the like of the vehicle system 700 and subsystems thereof. The ECUs 720, 722, 724, 726 may communicate with the computing system 702 as well as the functional components 716 and the sensors 718 over the in-vehicle network 714. While only four ECUs are depicted in FIG. 7, any number (more or fewer) of ECUs may be included in vehicle system 700.

FIG. 8 illustrates a block diagram of an example of a computing device 800. Computing device 800 can be any of the described computers herein including, for example, computing system 702 within the vehicle system 700 of FIG. 7 as well as ECUs 720, 722, 724, 726. The computing device 800 can be or include, for example, an integrated computer, a laptop computer, desktop computer, tablet, server, or other electronic device.

The computing device 800 can include a processor 840 interfaced with other hardware via a bus 805. A memory 810, which can include any suitable tangible (and non-transitory) computer readable medium, such as RAM, ROM, EEPROM, or the like, can embody program components (e.g., program code 815) that configure operation of the computing device 800. Memory 810 can store the program code 815, program data 817, or both. In some examples, the computing device 800 can include input/output ("I/O") interface components 825 (e.g., for interfacing with a display 845, keyboard, mouse, and the like) and additional storage 830.

The computing device 800 executes program code 815 that configures the processor 840 to perform one or more of the operations described herein. Examples of the program code 815 include, in various embodiments logic flowchart described with respect to FIG. 1 above. The program code 815 may be resident in the memory 810 or any suitable computer-readable medium and may be executed by the processor 840 or any other suitable processor.

The computing device 800 may generate or receive program data 817 by virtue of executing the program code 815. For example, sensor data, trip counter, authenticated messages, trip flags, and other data described herein are all examples of program data 817 that may be used by the computing device 800 during execution of the program code 815.

The computing device 800 can include network components 820. Network components 820 can represent one or more of any components that facilitate a network connection. In some examples, the network components 820 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 820 can be wired and can include interfaces such as Ethernet, USB, or IEEE 1394.

Although FIG. 8 depicts a computing device 800 with a processor 840, the system can include any number of computing devices 800 and any number of processors 840. For example, multiple computing devices 800 or multiple processors 840 can be distributed over a wired or wireless network (e.g., a Wide Area Network, Local Area Network, or the Internet). The multiple computing devices 800 or multiple processors 840 can perform any of the steps of the present disclosure individually or in coordination with one another.

Figure 9:
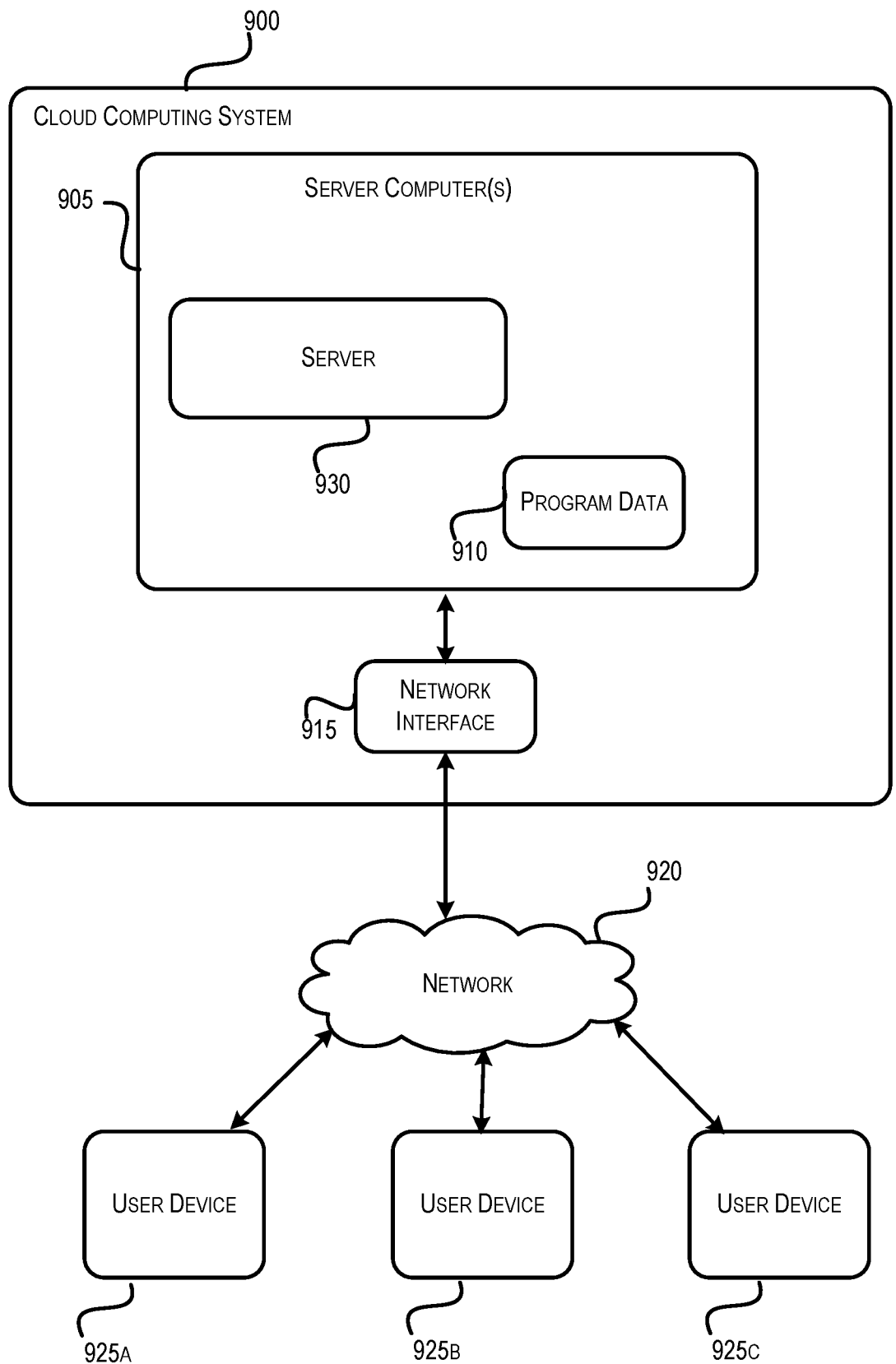
FIG. 9 illustrates a cloud computing system, according to some embodiments.

In some embodiments, the functionality provided by the computing device 800 may be offered as cloud services by a cloud service provider. For example, FIG. 9 depicts an example of a cloud computing system 900 offering an intelligence service that can be used by a number of user subscribers using user devices 925a, 925b, and 925c across a data network 920. User devices 925a, 925b, and 925c could be examples of a vehicle system 700 described above. In the example, the intelligence service may be offered under a Software as a Service (SaaS) model. One or more users may subscribe to the intelligence service, and the cloud computing system performs the processing to provide the intelligence service to subscribers. The cloud computing system may include one or more remote server computers 905.

The remote server computers 905 include any suitable non-transitory computer-readable medium for storing program code (e.g., server 930) and program data 910, or both, which is used by the cloud computing system 900 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 905 can include volatile memory, non-volatile memory, or a combination thereof.

One or more of the server computers 905 execute the program data 910 that configures one or more processors of the server computers 905 to perform one or more of the operations that determine locations for interactive elements and operate the adaptive rule-based system. As depicted in the embodiment in FIG. 9, the one or more server computers 905 provide the services to perform the adaptive rule-based system via the server 930. Any other suitable systems or subsystems that perform one or more operations described herein (e.g., one or more development systems for configuring an interactive user interface) can also be implemented by the cloud computing system 900.

In certain embodiments, the cloud computing system 900 may implement the services by executing program code and/or using program data 910, which may be resident in a memory device of the server computers 905 or any suitable computer-readable medium and may be executed by the processors of the server computers 905 or any other suitable processor.

In some embodiments, the program data 910 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 920.

The cloud computing system 900 also includes a network interface device 915 that enable communications to and from cloud computing system 900. In certain embodiments, the network interface device 915 includes any device or group of devices suitable for establishing a wired or wireless data connection to the data networks 920. Non-limiting examples of the network interface device 915 include an Ethernet network adapter, a modem, and/or the like. The server 930 is able to communicate with the user devices 925a, 925b, and 925c via the data network 920 using the network interface device 915.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed:

1. A vehicle system comprising:
   a Controller Area Network (CAN) bus of the vehicle system; and
   a plurality of electronic control units communicatively coupled to the CAN bus, each of the plurality of electronic control units transmits one or more messages each comprising one or more signals over the CAN bus, wherein each of the electronic control units is assigned a criticality rating based on a message classification of the one or more messages transmitted by the respective electronic control unit, wherein the message classification of a given message is assigned based on a signal classification of the one or more signals of the given message, and
   wherein each electronic control unit comprises one or more processors and a memory having stored thereon instructions that, upon execution by the one or more processors, cause the one or more processors to:
      receive a first message from a second electronic control unit of the plurality of electronic control units, wherein the second electronic control unit has a pre-assigned criticality rating; and
      apply a priority to the first message based on the message classification of the first message and the pre-assigned criticality rating of the second electronic control unit, wherein the first message is assigned higher priority when the second electronic control unit has a first criticality rating than when the second electronic control unit has a second criticality rating lower than the first criticality rating.

2. The vehicle system of claim 1, wherein the signal classification is one of critical or non-critical.

3. The vehicle system of claim 2, wherein the signal classification being one of critical or non-critical is based on an analysis of an impact of each of the one or more signals on the vehicle system.

4. The vehicle system of claim 1, wherein the signal classification comprises a rating based on subsystems of the vehicle system controlled by the one or more signals.

5. The vehicle system of claim 4, wherein the rating is determined for each of the one or more signals based on signal contents and predetermined rating decisions.

6. The vehicle system of claim 1, wherein the instructions further cause the one or more to:
   determine an identity of a receiver node of a second message as a critical node on the CAN bus based on the message classification of the second message being critical.

7. The vehicle system of claim 1, wherein the instructions, upon execution by the one or more processors, cause the one or more processors to:
   determine whether the first message is an authenticated message including security data in addition to the one or more signals, wherein the security data includes a truncated freshness value and a truncated message authentication code;
   retrieve the security data;
   generate a verification message authentication code based on the security data and an encryption key;
   compare the verification message authentication code to the truncated message authentication code;
   if at least a portion of the verification message authentication code matches with a portion of the truncated message authentication code, determine that the second electronic control unit is authorized to send the authenticated message via the CAN bus;
   if at least a portion of the verification message authentication code fails to match with a portion of the truncated message authentication code, ignore the authenticated message.

8. A computer-implemented method, comprising:
   determining a criticality rating for a first electronic control unit communicatively coupled to a controller area network (CAN) bus based on a message classification of one or more messages transmitted by the first electronic control unit, the message classification assigned based on a signal classification of one or more signals incorporated in the one or more messages;

receiving, at a second electronic control unit, a first message from the first electronic control unit, wherein the first electronic control unit has a pre-assigned criticality rating; and applying a priority to the first message based on the message classification and the pre-assigned criticality rating of the first electronic control unit coupled to a vehicle system, wherein the first message is assigned higher priority when the first electronic control unit has a first criticality rating than when the first electronic control unit has a second criticality rating lower than the first criticality rating.

9. The computer-implemented method of claim 8, wherein the signal classification is one of a critical classification or a non-critical classification.

10. The computer-implemented method of claim 9, wherein the critical classification further comprises a classification selected from:
- a vehicle motion classification;
- a safety classification;
- a security classification; or
- a regulatory classification.

11. The computer-implemented method of claim 9, wherein the signal being critical or non-critical is based on an analysis of an impact of each of the signals on the vehicle system.

12. The computer-implemented method of claim 8, wherein the message classification being assigned based on the signal classification comprises selecting the classification of at least one of the one or more signals based on a rank of the classification.

13. The computer-implemented method of claim 12, wherein the message classification being assigned based on the signal classification comprises selecting the signal classification based on a highest rank of the classification.

14. A system comprising:
a plurality of electronic control units communicatively coupled to a controller area network (CAN) bus, wherein each of the plurality of electronic control units transmits one or more messages each comprising one or more signals over the CAN bus, wherein each of the electronic control units is assigned a criticality rating based on a message classification of the one or more messages transmitted by the respective electronic control unit, wherein the message classification of a given message is assigned based on a signal classification of the one or more signals of the respective given message, and wherein each electronic control unit comprises one or more processors and a memory having stored thereon instructions that, upon execution by the one or more processors, cause the one or more processors to:
receive a first message from a second electronic control unit of the plurality of electronic control units, wherein the second electronic control unit has a pre-assigned criticality rating; and apply a priority to the first message based on the message classification of the first message and the pre-assigned criticality rating of the second electronic control unit, wherein the first message is assigned higher priority when the second electronic control unit has a first criticality rating than when the second electronic control unit has a second criticality rating lower than the first criticality rating.

15. The system of claim 14, wherein the signal classification being one of a critical classification or a non-critical classification is based on an analysis of an impact of each of the one or more signals on the system.

16. The system of claim 15, wherein the critical classification comprises a classification selected from:
- a vehicle motion classification;
- a safety classification;
- a security classification; or
- a regulatory classification.

17. The system of claim 14, wherein the signal classification comprises a rating based on sub-systems of the system controlled by the one or more signals.

18. The system of claim 17, wherein the rating is determined for each of the one or more signals based on signal contents and predetermined rating decisions.

19. The system of claim 14, wherein the instructions further cause the one or more to:
determine an identity of a receiver node of a second message as a critical node on the CAN bus based on the message classification of the second message being critical.

* * * * *

UNITED STATES PATENT AND TRADEMARK OFFICE
CERTIFICATE OF CORRECTION

PATENT NO. : 11,381,421 B2
APPLICATION NO. : 17/024449
DATED : July 5, 2022
INVENTOR(S) : Xin Ye et al.

It is certified that error appears in the above-identified patent and that said Letters Patent is hereby corrected as shown below:

In the Claims

In Claim 6, Column 14, Line 30, please insert -- processors -- between the words "more" and "to"

In Claim 14, Column 16, Line 3, please delete the work "respective"

In Claim 15, Column 16, Line 22, please delete "ora" and insert -- or a --

In Claim 19, Column 16, Line 38, please insert -- processors -- between the words "more" and "to"

Signed and Sealed this
Twenty-second Day of November, 2022

Katherine Kelly Vidal
*Director of the United States Patent and Trademark Office*